Nov. 15, 1927.

J. L. KIVLAN 1,649,599

CLOSURE FOR FRUIT JARS

Filed Feb. 16, 1925

INVENTOR:
John L. Kivlan
by Macleod, Calver, Copeland & Dike
ATTORNEYS

Patented Nov. 15, 1927.

1,649,599

UNITED STATES PATENT OFFICE.

JOHN L. KIVLAN, OF BOSTON, MASSACHUSETTS.

CLOSURE FOR FRUIT JARS.

Application filed February 16, 1925. Serial No. 9,402.

My invention relates to closures for glass jars such as are commonly employed to contain preserved fruit, vegetables and the like. The invention is adapted particularly for use in connection with glass jars having a separate glass cover which presses against an end face of the jar, the joint being sealed by a rubber ring or gasket. The particular object of the invention is to provide a jar, a closure therefor which is capable of being sealed with the least possible effort which when sealed will be tight and which can be manufactured cheaply.

Another object of the invention is to provide a closure for a jar of this character which, in one position of the parts, will hold the cover loosely in place, thereby permitting the escape of air, gas or steam from the interior during processing of the contents of the jar and which when the processing is complete may be instantaneously shifted to another position and will hold the cover firmly in place, thus permanently sealing the jar.

Still another object of the invention is to provide a closure for fruit jars the fastening means of one which is not likely to become displaced during shipment or handling.

The invention will be fully understood from the following description when taken in connection with the accompanying drawings and the novel features thereof will be pointed out and clearly defined in the claims at the close of this specification.

In the drawings:

Fig. 5 is a view in perspective of one of the clips shown in the preceding figures.

Figures 2, 3:
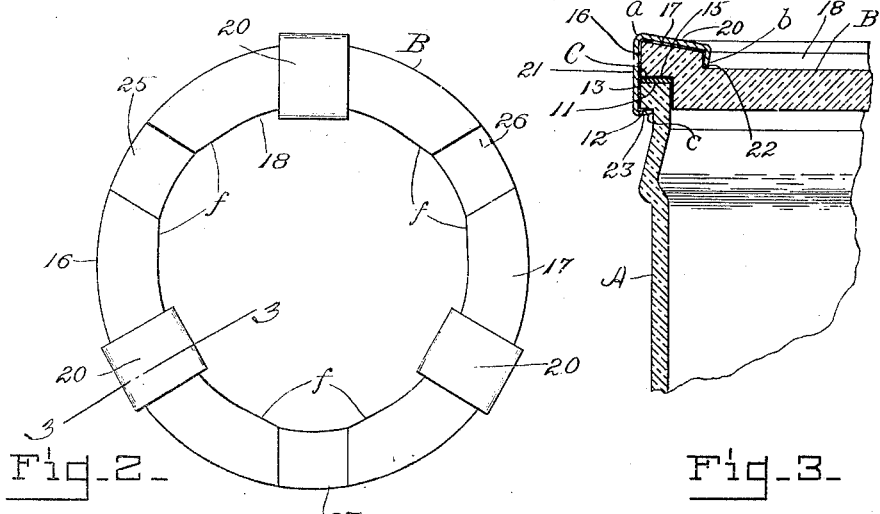
Fig. 2 is a top plan view of the jar shown in Fig. 1.
Fig. 3 is a section on the line 3—3, Fig. 2, with the clip which is shown in position to seal the jar permanently.
Figures 1, 4, 6:
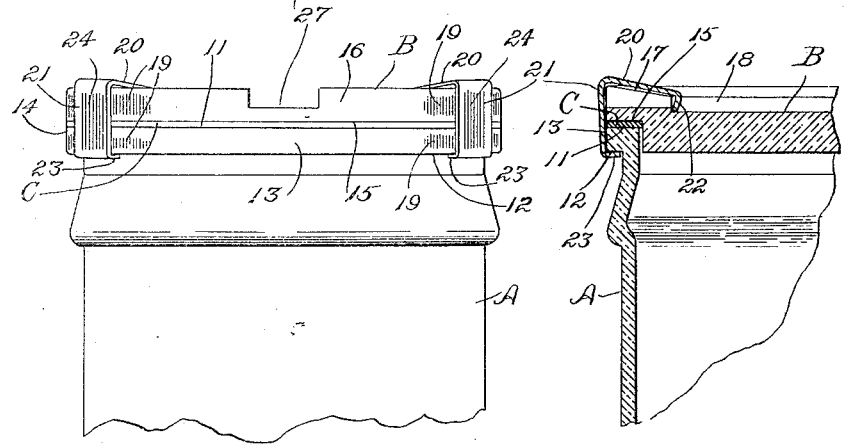
Fig. 1 is a side elevation of the upper part of a fruit jar embodying my present invention.
Fig. 4 is a view similar to Fig. 3 showing the position occupied by the clip during the processing, the cover being loosely held in place.
Fig. 6 is a horizontal section on the line 6—6, Fig. 1.

Referring now to the drawings, at A is shown the jar and at B the cover. The upper edge of the jar is provided with a flat face 11 (see Fig. 3), against which the rubber ring or gasket C rests. At 12 is shown the under face of a circumferential rib 13 formed around the upper edge of the jar. This rib 13 is preferably formed with a cylindrical outer face 14 as shown in Fig. 1. The cover B is formed with a face 15 parallel with the end face 11 of the jar and is adapted to contact with the rubber ring or gasket C. The circumferential edge 16 of the cover is preferably in line with or formed as an extension of the circumferential face 14 of the rib on the jar. The top or outer face 17 of the rib on the cover is preferably inclined as shown in the sectional views. The inner face 18 of the rib on the cover is approximately cylindrical as shown in Fig. 2. On a face or faces of the rib on the cover and of the rib on the top of the jar, I form roughened or corrugated areas 19, 19 for purposes to be explained hereinafter.

Referring now to Fig. 5 there is there shown a spring metal clip which is used to secure the cover to the jar. This clip consists of two legs 20 and 21 having inturned members 22 and 23 respectively and, as shown in the drawings, a roughened or corrugated area 24 which is complementary to the roughened surface or corrugations 19 already described as being formed on a surface or surfaces of the ribs on the cover and jar. When applied as shown in the drawings, this clip is adapted to have the inturned portion 23 engage the lower face of the rib on the jar, to have the leg 21 lie along and substantially in contact with the circumferential faces of the rib on the edge of the jar and the rib on the cover, to have the leg 20 lie along and substantially in contact with the top face of the rib of the cover and to have the inturned member 22 contact with the inner face of said rib on the cover. The clip is made of stiff spring metal and the legs will spring apart sufficient to permit it to be forced on over the edge of the cover and the rib on the jar. The two inturned portions 22 and 23 resist any tendency of the cover to come off and exert a force on the cover and the jar which is in line with the extreme inner corners of the inturned portions 22 and 23. I find in practice that if three of these clips are employed, the cover will be held in place perfectly securely, and that the jar is safe for shipment under ordinary conditions of use.

The roughened or corrugated portion of the clip 24 being in engagement with the complementary surface 19 on the jar or cover, there exists no tendency for the clip to be displaced circumferentially.

To permit the clips to be inserted more readily than by being forced over the edge as described, one of the ribs either that on the jar or that on the top may be cut away or interrupted at one or more places, the cut-away portion or interruptions being wide enough to permit the clip to be pushed on without being sprung considerably and without the use of any considerable force. Afterwards, the clip may be moved circumferentially until the top is held tightly in place and one of the roughened areas is in engagement with the corresponding area on the clip. This tightening of the jar by a circumferential movement of the clips is facilitated by inclined surfaces $f$ which extend from the edge of interruptions 25, 26 and 27. The edges of the clips ride up these inclined surfaces and thus are subjected to tension and the top tightened. In Fig. 2 of the drawings I have shown the three cut-away portions or interruptions 25, 26 and 27, these being formed in the rib on the top. These cut-away portions also make it possible to place the clip on the jar as shown in Fig. 3 at which time it holds the cover lightly in place so that the air, gas or steam which is developed during the processing can escape freely without permitting the contents of the jar to escape. Thereafter, by pushing the clips around to their final position, as already explained, the cover may be permanently secured in place.

In practice, I make the legs 20 and 21 of the clip of equal length and construct the cover so that the distance from $a$ to $b$, as shown in Fig. 3, is equal to the distance from $a$ to $c$. By thus proportioning the parts, the clip is reversible so that no attention is required to make sure that it is put on the jar in the proper position.

Figure 7:
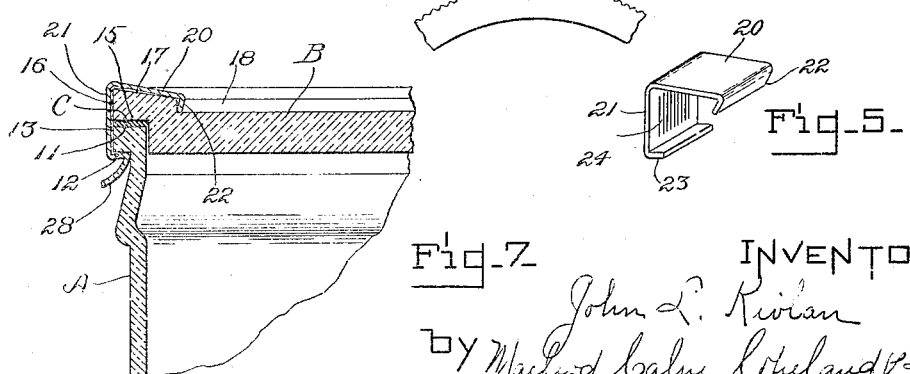
Fig. 7 is a view similar to Fig. 3 showing a modified form of clip.

In Fig. 7 I have shown a clip provided with a handle 28 which renders it easier to remove the clip from the jar. Such a handle can be of any required length or shape.

Having thus described my invention what I claim is:

1. In combination with a jar and a cover therefor, the jar having a circumferential rib at the top and the cover having a rib on its top face and a spring clip engaging the opposite edges of said ribs, the inside surface on said clip and of one of said ribs being complementarily roughened for engagement with each other to prevent circumferential movement of the clip relative to the jar and cover.

2. In combination with a jar and a cover therefor the jar having a circumferential rib at the top, the cover having a rib on its top face and a spring clip engaging both of said ribs, the inner surface of said clip and the outer periphery of one of said ribs having vertical corrugations for engagement with each other to prevent circumferential movement of the clip relative to the jar and cover.

3. In combination, a jar and a cover therefor, the jar having a circumferential rib around its top and a shoulder on its under side, the cover having a circumferential rib formed with an under face parallel with the upper face of the rib of the jar and supported thereon, said cover rib having a top face terminating in a downwardly extending shoulder at its inner periphery, the said cover having a plurality of transverse recesses in its top face and having inclined portions extending from one edge of said recesses towards an adjacent recess and a plurality of spring clips each having two legs at an angle to each other, one leg being adapted to lie on the top face of the cover rib and terminating in a turned end adapted to engage the shoulder at the inner periphery of said rib, the other leg being adapted to lie against the outer peripheries of both of said ribs and terminating in a bent portion adapted to engage the underside of the rib of the jar, the inner surface of said clip and the outer periphery of one of said ribs having vertical corrugations for engagement with each other to prevent circumferential movement of the clip relative to the jar and cover.

In testimony whereof I affix my signature.

JOHN L. KIVLAN.